(12) United States Patent  
Fritter

(10) Patent No.: US 6,615,973 B2
(45) Date of Patent: Sep. 9, 2003

(54) CART FOR LOADING, UNLOADING AND TRANSPORTING A TOOLBOX

(76) Inventor: Casey Fritter, HCR 72, Box 109A, Alton, NH (US) 03809

( * ) Notice: Subject to any disclaimer, the term of this patent is extended or adjusted under 35 U.S.C. 154(b) by 0 days.

(21) Appl. No.: 09/847,787

(22) Filed: May 2, 2001

(65) Prior Publication Data

US 2002/0164240 A1 Nov. 7, 2002

(51) Int. Cl.[7] ................................................. B60P 1/64
(52) U.S. Cl. ................. 198/498; 224/402; 414/346
(58) Field of Search ........................... 414/498, 340, 414/343, 345, 346, 349, 350, 537, 538, 499, 500; 14/72.5, 69.5, 71.2, 71.1; 224/402, 403, 310

(56) References Cited

U.S. PATENT DOCUMENTS

| | | | |
|---|---|---|---|
| 2,127,972 A | 8/1938 | Hutchinson et al. | 280/44 |
| 2,623,759 A | * 12/1952 | Forbas | |
| 3,021,793 A | * 2/1962 | Hayba et al. | 414/401 XV |
| 3,180,281 A | * 4/1965 | Sherrie et al. | |
| 3,454,173 A | * 7/1969 | Martin | |
| 3,945,522 A | * 3/1976 | Suizu et al. | |
| 4,230,329 A | 10/1980 | Johnson | 280/43.17 |
| 5,135,350 A | 8/1992 | Eelman et al. | 414/786 |
| 5,224,812 A | * 7/1993 | Oslin et al. | 414/401 XV |
| 5,423,651 A | 6/1995 | Dinverno | 414/500 |
| 5,570,988 A | 11/1996 | Gallaway et al. | 414/498 |
| 5,642,898 A | 7/1997 | Wise | 280/652 |
| 5,775,865 A | 7/1998 | Capilupi, Jr. | 414/498 |
| 6,006,971 A | 12/1999 | Coleman et al. | 224/404 |

* cited by examiner

Primary Examiner—Christopher P. Ellis
Assistant Examiner—Richard Ridley
(74) Attorney, Agent, or Firm—McLane, Graf, Raulerson & Middleton, PA

(57) ABSTRACT

The present invention is a cart that facilitates the unloading and loading of a toolbox from a vehicle used to transport the toolbox from one jobsite to another. Fundamentally, the cart comprises a support frame, with u-shaped wheel channels atop the frame, and wheel channel ramps pivotally connected to the frame such that the ramps can bridge the cart to a vehicle for loading or unloading a toolbox. The preferred embodiment of the invention has a frame that is rectangular in shape, and comprises vertical support legs connected by a plurality of lengthwise lower and top rails, and a plurality of transverse cross members. The top rails are u-shaped wheel channels that receive the wheels of the toolbox being loaded or unloaded from a vehicle. A pair of wheel channel ramps is pivotally connected to one end of the top rails, and when extended, the ramps can serve to connect the cart to the vehicle. The cart itself is fastened to and sits atop wheels such that the cart easily can be moved. The cart of this invention presents an inexpensive device that allows one person to safely unload and load a heavy toolbox from and to a vehicle with no need for additional help or machinery.

20 Claims, 3 Drawing Sheets

CART FOR LOADING, UNLOADING AND TRANSPORTING A TOOLBOX

FIELD OF THE INVENTION

The present invention relates to the field of devices used to load, unload and transport a heavy toolbox without manually lifting the toolbox.

BACKGROUND OF THE INVENTION

Many trades require the transport of heavy toolboxes. Machinists, auto mechanics, plumbers, electricians and other tradesmen frequently have the need to transport their tools to and from various job sites. Typical toolboxes filled with tools frequently weigh 300 pounds or significantly more. Most conventional toolboxes are equipped with wheels, thereby allowing for the toolboxes to be moved around a jobsite with relative ease. However, because of the weight of the toolboxes, it is often impossible for one person to unload a toolbox from his or her vehicle upon arrival at a jobsite. Likewise, loading a toolbox back into a vehicle may be impossible for one person to accomplish.

Accordingly, tradesmen are often forced to utilize a fork lift or other mechanical lifting means to remove a heavy toolbox from the back of their trucks or from other vehicles. If there is sufficient manpower available, a tradesmen may rely on manual assistance from others. But even with sufficient assistance, back and other injuries may result from lifting the toolbox. Moreover, reliance on the availability of manual or mechanical lifting means may be impractical for many tradesmen.

If manual or mechanical assistance necessary to remove a toolbox from a vehicle is not available at a particular jobsite, the tradesman typically has to leave his toolbox in his vehicle. This in turn may require him to make repeated trips to his vehicle in order to retrieve the necessary tools. The task of making repeated trips to the vehicle from the actual work site can be time-consuming and inefficient. Furthermore, frequently tools are removed from the vehicle, carried to the worksite and spread in a haphazard manner over the floor or other work surface. This may result in the misplacement of tools and further inefficiency because the tools are temporarily stored in a disorganized fashion. Additionally, when tools are spread out randomly on the floor of the worksite, the danger of tripping may arise. Of course, if possible, the vehicle itself can be parked close to the immediately, but on many jobs this may be impossible or impractical.

There exists in the prior art various carts designed to serve as mobile tool carts that can be transported from one job site to another. For example, U.S. Pat. No. 5,423,651, issued to Dinverno, discloses a pyramid shaped service cart that provides a practical tool cart with increased stability during transport. The tool cart itself contains various storage areas for the storage of and easy access to tools of all types. Although this cart may be easily transported from one job site to another, it requires a ramp and winch system to remove the cart from the transporting vehicle. Specifically, the U.S. Pat. No. 5,423,651 patent discloses a van having ramps stored in drawers of the van and a winch system used to load and unload the cart to and from the van respectively.

U.S. Pat. No. 5,642,898, issued to Wise, discloses a tool cart designed and configured to receive a number of diverse tools and accessories. The cart is wheeled, thereby allowing mobility once the tool cart is at a particular jobsite. However, this invention does not relate to a device that can be used to easily load and unload the tool cart from a vehicle.

There does exist devices and methods that facilitate the loading and unloading of heavy cargo from vehicles. For example, U.S. Pat. No. 5,135,350, issued to Eelman, discloses a method for the easy removal of a patient on a litter from an ambulance. The method utilizes a cart structure that is mounted on swivel casters and comprises two wheel tracks to receive the wheels of the ambulance litter. The device includes an upper platform with wheel tracks that can be lowered and raised so that the wheeled tracks can be positioned such that the wheeled litter can be rolled onto the wheel tracks of the cart. The wheel tracks can be adjusted to the height of an ambulance due to the movable nature of the upper platform. The cart disclosed is structurally designed to transport a litter from an ambulance into the hospital, but the cart itself is not intended to be transported to and from a site. The adjustable nature of the cart decreases the rigidity, strength and carrying ability of the cart and increases the cost of building the cart. The cart disclosed does not allow for the economical transport of heavy toolboxes from one site to another.

Thus, there exists a need for a device that allows those that need to transport heavy toolboxes to be able to load and unload their toolboxes from a vehicle without the need for additional manual or mechanical assistance. The device needs to be structurally able to withstand the heavy load of industrial toolboxes and preferably can be built inexpensively.

SUMMARY OF THE INVENTION

The present invention is a cart that facilitates the unloading and loading of a toolbox from a vehicle used to transport the toolbox from one jobsite to another. In its elemental form, the cart comprises a wheeled frame on which a toolbox can be loaded. Atop the frame are two rails having unshaped wheel channels for receiving the wheels of a toolbox. Pivotally attached to the frame at one end of each of the two rails are wheel channel ramps which are used to serve as a bridge between the cart and the vehicle from which the toolbox is to be unloaded (or on which the toolbox is to be loaded). The cart itself can be transported along with the toolbox, and when necessary, the cart can be used to unload the toolbox from the transporting vehicle. When the toolbox must be loaded back into the vehicle, the cart can facilitate the loading process and then itself be easily placed back in the transporting vehicle.

It is an important aspect of this invention to facilitate the loading, unloading and transport of toolboxes.

It is another important aspect of this invention to provide a rigid tool cart that can be used to load, unload and transport toolboxes weighing up to 800 pounds.

It is a further aspect of this invention to provide a cart that allows for a heavy toolbox to be loaded and unloaded from a vehicle by one person without the need for a forklift or other machinery.

Another aspect of this invention is to provide a cart for transporting toolboxes that can be constructed inexpensively.

It is another aspect of this invention to provide a cart that allows for the loading, unloading and transporting of a heavy toolbox by one person with little or no physical strain.

It is important aspect of this invention to provide a device that allows tradesmen and others to move their toolbox to the immediate vicinity of a worksite.

It is an additional aspect of this invention to provide a cart upon which a toolbox can be loaded and transported in a safe and stable manner.

BRIEF DESCRIPTION OF THE DRAWINGS

Other aspects and advantages of the invention will become apparent upon a careful reading of the following detailed description of the invention, the claims and the drawings, in which like reference characters are used throughout to denote like parts in the several views, wherein:

The following invention will be described in connection with a preferred embodiment and it is not intended to limit the invention to that embodiment. On the contrary, it is intended to cover all alternative modifications and equivalents as may be included in the spirit and scope of the invention as defined by the appended claims.

DETAILED DESCRIPTION OF THE INVENTION

The apparatus of this invention is a mobile cart that can be used to load and unload a toolbox from a vehicle used to transport the toolbox. Fundamentally, the cart comprises a support frame, with unshaped wheel channels atop the frame, and wheel channel ramps pivotally connected to the frame such that the ramps can bridge the cart to a vehicle for loading or unloading a toolbox. The preferred embodiment of the invention has a frame that is rectangular in shape, and comprises vertical support legs connected by a plurality of lengthwise lower and top rails, and a plurality of transverse cross members. The top rails are unshaped wheel channels that receive the wheels of the toolbox being loaded or unloaded from a vehicle. A pair of wheel channel ramps is pivotally connected to one end of the top rails, and when extended, the ramps can serve to connect the cart to the vehicle. The cart itself is fastened to and sits atop wheels such that the cart easily can be moved.

Figure 1:
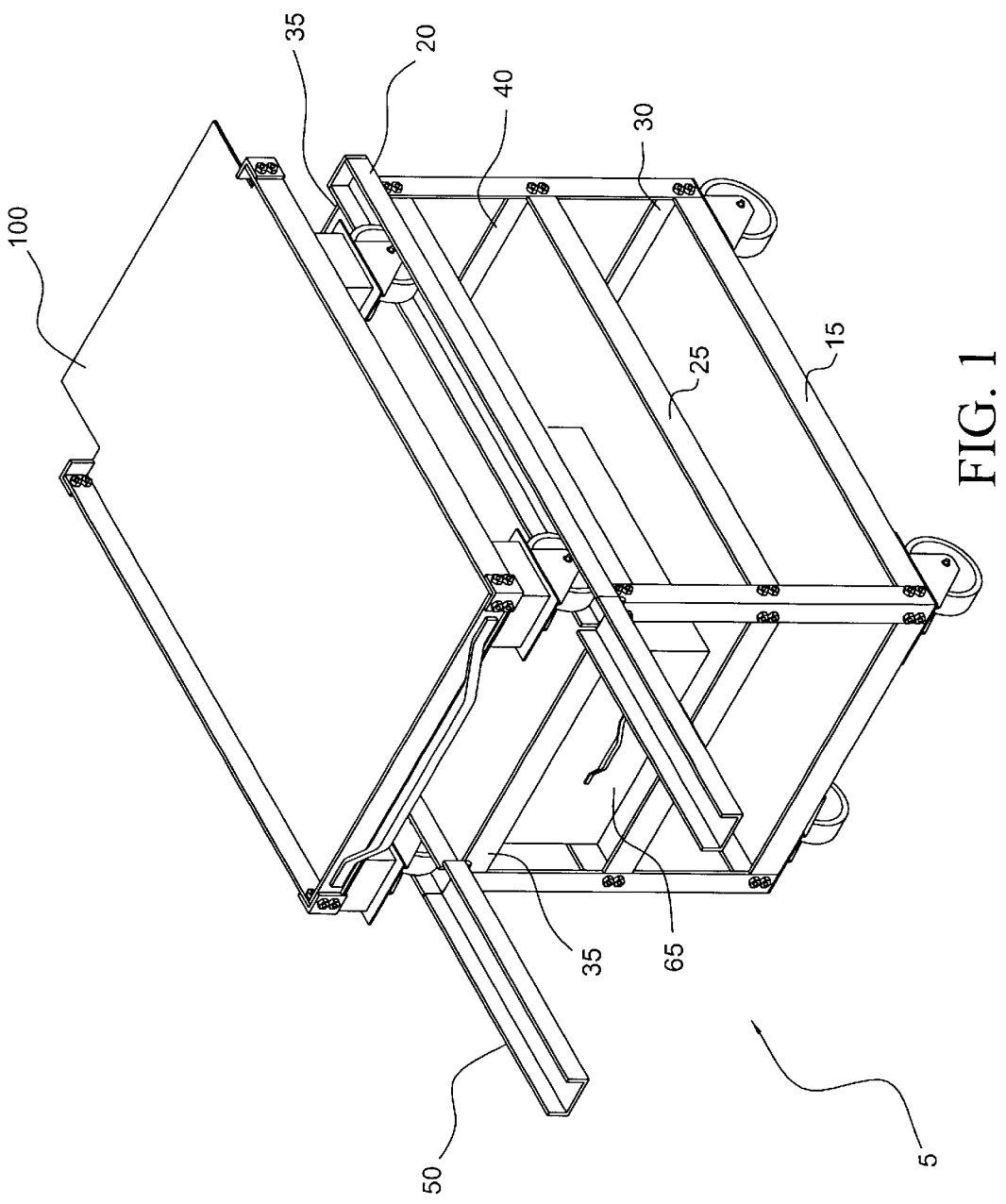
FIG. 1 is a perspective view of the cart of this invention with a conventional wheeled toolbox sitting atop the cart.
Figure 2:
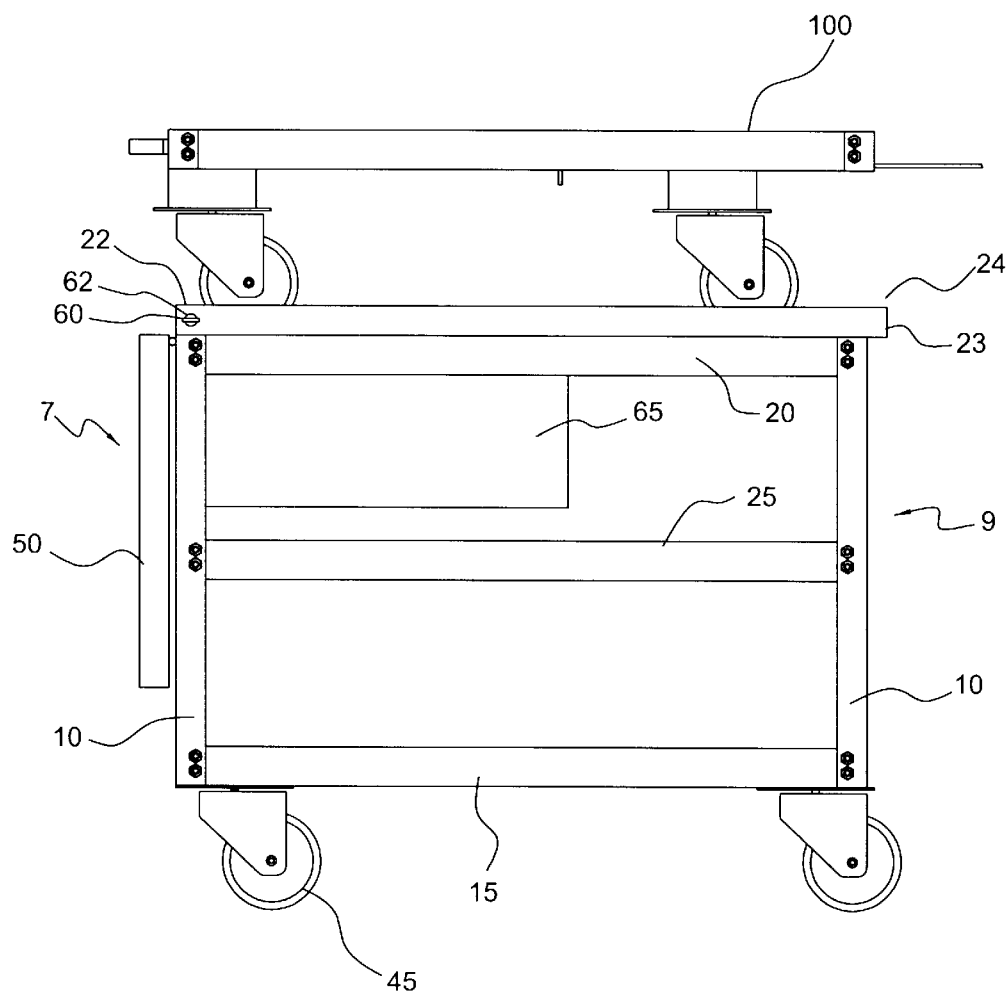
FIG. 2 is a side view of the cart of this invention.

FIG. 1. presents a perspective view of the cart 5 with a conventional wheeled toolbox 100 sitting atop the cart. As illustrated in FIG. 2, the frame structure of the cart has a front end 7 and a back end 9. The frame structure of the preferred embodiment has two pairs of oppositely disposed vertical legs 10, each leg having a lower and upper end. The lower ends of each of the vertical legs 10 in each pair are coupled by a pair of oppositely disposed base rails 15 that run lengthwise between the pairs of vertical legs 10, thereby defining a longitudinal direction of the cart 5. The upper ends of each of the vertical legs 10 in each pair are coupled by a pair of oppositely disposed top rails 20 that run lengthwise between the vertical legs 10. To provide enhanced stability to the cart, the preferred embodiment also includes a pair of oppositely disposed intermediate rails 25 that couple the vertical legs 10 in each pair as illustrated in FIG. 2.

In the preferred embodiment, the corresponding vertical legs 10 of each pair of vertical legs 10 is coupled together by a lower transverse bar 30 and an upper transverse bar 35. These transverse bars provide further stability and strength to the cart frame. In the preferred embodiment of the cart of this invention, the frame also has a pair of oppositely disposed intermediate transverse members 40 coupling the corresponding vertical legs 10 of each pair of vertical legs. These intermediate transverse members 40 are attached to the vertical legs 10 generally adjacent to where the intermediate rails 25 are attached to the vertical legs as shown in FIG. 2.

Figure 3:
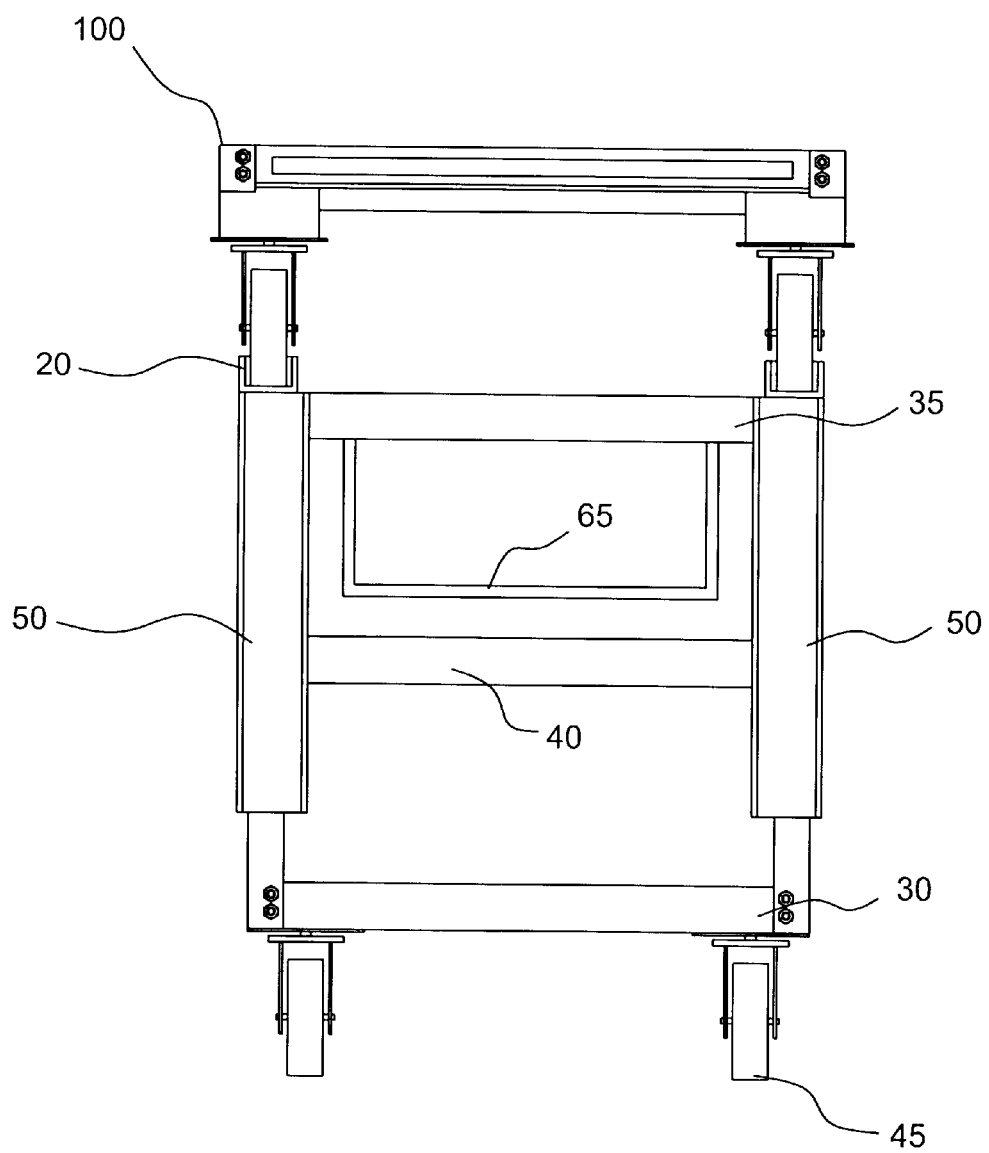
FIG. 3 is an end view of the cart of this invention, showing the front end of the cart.

As illustrated in FIGS. 2 and 3, the frame of the cart 5 is mounted on wheels 45 to allow for easy mobility of the cart. Preferably, the cart has four wheels, with a wheel attached at the lower end of each vertical leg 10. The four wheels 45 can be swivel caster wheels for ease of mobility, or as in the preferred embodiment, the pair of wheels 45 situated at the front end of the cart can be swivel caster wheels, while the pair of wheels situated at the back end of the cart can be fixed-direction wheels. Although the preferred embodiment uses the above-described four-wheel assembly, various wheel assemblies can be used to allow for mobility of the cart.

The materials used for the supporting members of the frame structure of the cart can be virtually any materials that provide sufficient strength properties at a desired cost. The preferred embodiment of this invention has a frame structure made of cast iron members, as the inventor has found that such a structure provides the strength and toolbox to transport toolboxes weighing up to 800 pounds. Other metals, such as aluminum, may be used to provide a lighter frame structure with sufficient strength and stability for most toolboxes. The individual members of the cart frame can be attached to one other by any conventional manner, including by use of conventional fasteners such as nuts and bolts, screws or conventional welding. In the preferred embodiment, the individual members are welded to one another.

The dimensions of the cart can be adjusted for the particular dimensions of the tool box to be transported. The inventor has found that conventional tool boxes typically are between 3 feet and 4 feet in length and between 2 feet and 3 feet in width. The height of the cart, as defined by the length of the vertical legs 10 in combination with the height of the wheels 45 is similarly adjustable, and should correspond generally to the height of the vehicle platform from which the toolbox will be unloaded.

Regardless of the materials used, the top rails 20 of the frame structure of the cart 5 must be generally u-shaped wheel channels of sufficient width to accept the wheels of a wheeled toolbox. Conventional toolboxes are equipped with wheels that are less than one inch in width, so for instance if the u-shaped wheel channels of the top rails 20 are greater than one inch in width, the channels should be sufficiently wide to accept the wheels of most toolboxes. The inventor has found that wheel channels having widths between 2.5 inches and 3 inches are suitable for conventional wheeled toolboxes. Each of the oppositely disposed top rails has a front end 22 and a back end 24 corresponding respectively to the front end 7 of the cart 5 and the back end 9 of the cart 5. In the preferred embodiment, the front end 22 of each top rail is opened ended and the back end 24 is a wheel stop plate 23 that bisects and closes the u-shaped channel at the end of the rail. As discussed further below, this stop plate 23 ensures that the wheels of a toolbox loaded on top of the cart do not completely traverse the u-shaped wheel channels, thereby causing the toolbox to roll off the back end 9 of the cart.

A pair of oppositely disposed wheel channel ramps 50 mounted parallel to one another and pivotally attached to the cart frame structure at the front end 7 of the cart frame structure where the front end 22 of the oppositely disposed top rails 20 meet the upper end of the corresponding vertical legs 10. Each of the wheel channel ramps 50 is a u-shaped channel of similar dimensions to the u-shaped channels of the top rails. As shown in FIG. 2, the wheel channel ramps 50 are pivotally mounted such that when extended in the horizontal or nearly horizontal position, the wheel channel ramps extend 50 outwardly away from the front end 7 of the cart frame structure. When the wheel channel ramps 50 are extended outwardly away from the front end of the cart as illustrated in FIG. 1, the wheel channel ramps 50 provide an extension of the u-shaped wheel channels of the top rails. When the wheel channel ramps 50 are not extended outwardly from the front end 7 of the cart frame structure as illustrated in FIGS. 2 and 3, they fold downward and fall vertically, thereby resting against the vertical legs 10 at the front end 7 of the cart.

The preferred embodiment of the cart of this invention has a pair of retaining pins 60 removably attached to the front end 22 of each top rail 20 of the cart. When attached, the retaining pin 60 transects the corresponding u-shaped wheel channel of the top rail 20 such that it prevents a wheel of a toolbox from traveling past the retaining pin 60. As shown in FIG. 2, the retaining pin 60 of the preferred embodiment can be removably attached to the top rails 20 by being passed through two oppositely disposed apertures 62 located along the walls of the u-shaped wheel channels at the front ends 22 of the top rails 20. A variety of retaining pins 60 can be used to prevent passage of a wheel through the wheel channel of the top rail 20, and the preferred embodiment of this invention uses a conventional cotter pin passed through the oppositely disposed apertures 62.

The preferred embodiment of this invention has a storage drawer 65 slidably attached to the cart frame structure to allow for additional storage of tools and other items. The storage drawer 65 can be attached in various manners to the cart frame and can be attached anywhere below the top rails 20. As show in FIGS. 2 and 3, the preferred embodiment has the storage drawer 65 slidably attached to the lower surface of the upper transverse bars 35.

The cart of this invention can be used by all types of tradesmen who have the need to transport heavy toolboxes to and from a worksite or from one worksite to another. Many tradesmen transport their toolboxes in the back of a conventional pick-up truck or van. In order to utilize the cart of this invention, the user would transport the cart along with the toolbox in the pick-up truck or van. The inventor has found that the cart can fit in the back of a conventional pickup truck along with a conventional wheeled toolbox.

Upon arrival at the particular worksite, the user would first remove the cart from the back of the truck. This can be done by one person with little physical strain by first lowering one end of the cart onto the ground, and then simply lowering the second end onto the ground. Next, the cart is rolled on its wheels into position so that the toolbox can be rolled from the truck or van directly onto the cart.

The user would position the front end of the cart 5 such that the front ends 22 of the top rails 20 are adjacent to the platform of the truck or van. The wheel channel ramps 50 are then extended outwardly from the cart generally in a horizontal fashion such that they connect with and rest in a nearly flat position on the platform of the truck or van. The spacing between the two wheel channel ramps 50 corresponds with the spacing between the wheels of the toolbox to be unloaded.

Accordingly, the toolbox can then be wheeled across the wheel channel ramps 50 and onto the wheel channels of the top rails 20 of the cart. As in the preferred embodiment, if the wheel channels of the top rails 20 have a retaining pin 60 at the front ends 22 of the rails, the retaining pin should be removed before unloading the toolbox onto the cart 5. The toolbox can then be guided along the wheel channels of the top rails 20 until all wheels of the toolbox are resting in the wheel channels on the top rails 20 of the cart 5.

Because of the significant weight of many toolboxes, it is not safe or practical to attempt to roll the toolbox onto any type of transport device if there is the possibility that the toolbox will not properly roll onto the device and accidentally fall to the ground. Because the wheel channel ramps 50 on the cart 5 of this invention are attached to the cart itself, the weight of the toolbox on the wheel channel ramps 50 assures that the cart 5 will not accidentally move away from the vehicle once the toolbox is rolled onto the wheel channel ramps 50.

The stop plates 23 positioned at the back end 24 of each top rail ensure that the toolbox does not roll off the back end of the cart 5. Once the toolbox is loaded fully onto the cart 5, the user can then put the retaining pin 60 in place to prevent the toolbox from accidentally rolling off the front end of the cart. After the toolbox is loaded onto the cart 5, the cart and the toolbox can be rolled to the immediate area of the worksite, and the tradesman will have easy access to his or her tools.

When the tradesman wants to leave the worksite and transport the toolbox elsewhere, he can simply wheel the cart 5 and toolbox back to the transporting vehicle. When the front end of the cart is adjacent to the bed of the truck or van being used to transport the toolbox, the wheel channel ramps are extended so as to bridge the cart and the vehicle. The retaining pin 60 is removed, thereby allowing the toolbox to be rolled off the top rails 20 of the cart 5 and onto the vehicle platform.

Once the toolbox is secured on the platform of the transporting vehicle, the user can lift the front end of the cart onto the vehicle platform and push the cart up onto the vehicle platform. The cart 5 of this invention allows the user to safely load or unload his or her toolbox from a transporting vehicle without having to rely on any additional persons or machinery.

From the foregoing, it can be understood that this invention is one well adapted to attain all of the ends and aspects set forth above, together with other advantages that are inherent to the apparatus. It will be understood that certain features and subcombinations are of utility and may be employed with reference to other features and subcombinations. This is contemplated by and is within the scope of the claims. Although a preferred embodiment of the invention has been described using specific terms, such description is for illustrative purposes only, and it is to be understood that changes and variations may be made without departing from the scope or spirit of the following claims.

I claim:

1. A cart for transoorting loading and unloading a wheeled toolbox, wherein the cart comprises:
   a. a wheel assembly for contact with the ground;
   b. a frame assembly connected to the top of the wheel assembly;
   c. two rails mounted to a top of the frame assembly, said rails oppositely disposed and in parallel relationship to one another and defining a longitudinal direction of said cart, each said rail having a front end and a back end, and each of said rails further having a wheel channel running longitudinally along the rail thereby being able to receive the wheels of the toolbox, each of said wheel channels having two oppositely disposed walls and a channel floor running longitudinally along the rail;
   d. two wheel channel ramps pivotally mounted to the front ends of the two top rails such that the wheel channel ramps can join and extend outwardly from the front end of the corresponding top rails; and e. a stop plate transecting the wheel channels at the back ends of the top rails, thereby preventing a toolbox wheel from traversing said wheel channels.

2. The cart of claim 1, wherein the wheel assembly comprises a plurality of swivel caster wheels.

3. The cart of claim 1, further including a storage drawer coupled to the frame assembly.

4. The cart of claim 1, wherein the front ends of the top rails have a removably attached retaining pin, said retaining pin being able to prevent passage of a toolbox wheel.

5. The cart of claim 1 or claim 4, wherein each of the walls of the wheel channels has an oppositely disposed aperture at the front end of the rail, thereby allowing the insertion of a retaining pin, said retaining pin being able to prevent passage of a toolbox wheel.

6. The cart of claim 1, wherein the frame assembly, rails and wheel channel ramps are made of cast iron.

7. The cart of claim 1, wherein the frame assembly, rails and wheel channel ramps are made of aluminum.

8. The cart of claim 1, wherein the frame assembly comprises:
 a first pair of oppositely disposed vertical legs, each of said legs having a lower end and an upper end,
 a first lower rail running between and attached to the lower ends of the vertical legs in said first pair of oppositely disposed vertical legs,
 a second pair of oppositely disposed vertical legs, each of said legs having a lower end and an upper end, and
 a second lower rail running between and attached to the lower ends of the vertical legs in said second pair of oppositely disposed vertical legs.

9. The cart of claim 8, wherein the frame assembly further comprises at least one pair of transverse members coupling the corresponding vertical legs of the first and second pair of vertical legs, said transverse members running perpendicularly to the lower and top rails.

10. The cart of claim 8, wherein the frame assembly further comprises:
 a. a first intermediate rail running between and attached to the vertical legs in said first pair of oppositely disposed vertical legs at a point between the lower and upper ends of said vertical legs; and
 b. a second intermediate rail running between and attached to the vertical legs in said first pair of oppositely disposed vertical legs at a point between the lower and upper ends of said vertical legs.

11. The cart of claim 8, wherein the wheels are swivel caster wheels.

12. The cart of claim 1 wherein the front ends of the top rails have a removably attached retaining pin, said retaining pin being able to prevent passage of a toolbox wheel.

13. The cart of claim 1 or claim 12, wherein each of the walls of the wheel channels has an oppositely disposed aperture at the front end of the rail, thereby allowing the insertion of a retaining pin, said retaining pin being able to prevent passage of a toolbox wheel.

14. The cart of claim 1, wherein the frame, top rails, and wheel channel ramps are made of cast iron.

15. The cart of claim 1, wherein the frame, top rails, and wheel channel ramps are made of aluminum.

16. A cart for transporting a wheeled toolbox, comprising:
 a. a wheel assembly for contact with the ground;
 b. a frame assembly connected to the top of the wheel assembly;
 c. two rails mounted to a top of the frame assembly, said rails oppositely disposed and in parallel relationship to one another and defining a longitudinal direction of said cart, each said rail having a front end and a back end, and each of said rails further having a wheel channel running longitudinally along the rail thereby being able to receive the wheels of the toolbox, each of said wheel channels flaying two oppositely disposed walls and a channel floor running longitudinally along the rail;
 d. two wheel channel ramps pivotally mounted to the front ends of the two top rails such that the wheel channel ramps can join and extend outwardly from the front end of the corresponding top rails; and
 e. a storage drawer coupled to the frame assembly.

17. A cart for transporting a wheeled toolbox, comprising:
 a. a wheel assembly for contact with the ground;
 b. a frame assembly connected to the top of the wheel assembly;
 c. two rails mounted to a top of the frame assembly, said rails oppositely disposed and in parallel relationship to one another and defining a longitudinal direction of said cart, each said rail having a front end and a back end, and each of said rails further having a wheel channel running longitudinally along the rail thereby being able to receive the wheels of the toolbox, each of said wheel channels having two oppositely disposed walls and a channel floor running longitudinally along the rail;
 d. two wheel channel ramps pivotally mounted to the front ends of the two top rails such that the wheel channel ramps can join and extend outwardly from the front end of the corresponding top rails; and
 e. a retaining pin removably attached to the front ends of the top rails, said retaining pin being disposed to prevent passage of a toolbox wheel.

18. The cart of claim 17, wherein each of the walls of the wheel channels has an oppositely disposed aperture at the front end of the rail, thereby allowing the insertion of said retaining pin.

19. The cart of claim 17, further comprising:
 a stop plate transecting the wheel channels at the back ends of the top rails, thereby preventing a toolbox wheel from traversing said wheel channels; and
 a storage drawer coupled to the frame assembly.

20. The cart of claim 17, wherein the frame, top rails, and wheel channel ramps are made of a material selected from aluminum and cast iron.

* * * * *